Sept. 18, 1934.    A. MAGNANI    1,974,337

PROCESS FOR OBTAINING HOLLOW BODIES FORMED OF PLASTIC MATERIALS

Filed Oct. 18, 1932

Inventor:
Alessandro Magnani
By Emil Bömelyche
Attorney

Patented Sept. 18, 1934

1,974,337

UNITED STATES PATENT OFFICE 1,974,337

PROCESS FOR OBTAINING HOLLOW BODIES FORMED OF PLASTIC MATERIALS

Alessandro Magnani, Broni, Italy

Application October 18, 1932, Serial No. 638,419
In Italy October 31, 1931

2 Claims. (Cl. 18—59)

The employment of tubes formed of plastic materials, like cement, mixed with fibrous substances, such as asbestos, has taken a very remarkable development. In the case of conduits composed of said tubes, it is necessary to employ a great number of hollow pieces, which are not cylindrical, required for assuring the changes of direction, branchings, leadings-off and the like. The manufacturing of said pieces presents remarkable difficulties, as it imposes the use of internal molding cores formed of several pieces, the drawing out of which, when the operation is terminated, results in a difficult and even dangerous operation for the proper maintenance of the walls of the molded pieces. The manufacturing of these parts is long, delicate and expensive.

The present invention has for its object a simplified manufacturing process which allows hollow pieces in any shape to be very easily produced; said process being characterized by the independent molding, on the back of two separated cores, of two shells adapted to form, when joined, the desired piece, and the subsequent mutual soldering of said shells along their borders suitably predisposed, under the action of a revolving ramming tool suitably shaped, which acts on the internal surface of the resulting piece closed within a hollow mold.

The invention is hereafter described with reference to the manufacturing of a bend forming a curved sleeve, but evidently it can be easily adapted to other pieces capable of being formed in two shells equal to one another or not.

Figure 1:
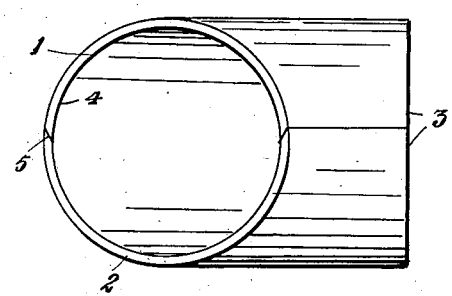
Figs. 1 and 2 represent the sleeve to be formed respectively in elevation view and in middle horizontal section.
Figure 3:
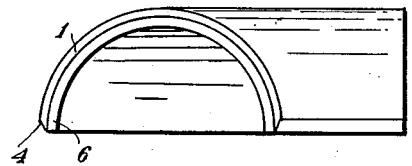
Figs. 3 and 4 show the two shells into which the sleeve has been formed, said shells being mounted on two separated cores.
Figure 2:
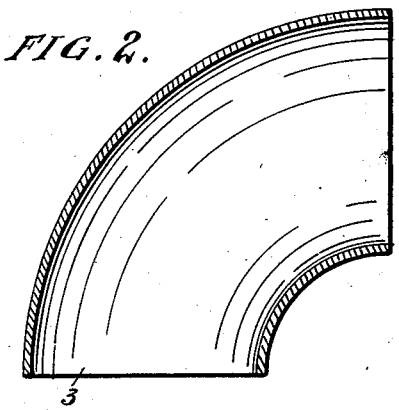
Figure 4:
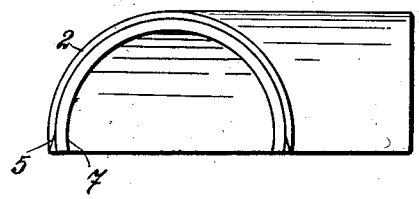
Figure 5:
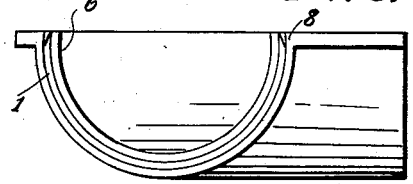
Figs. 5 and 6 represent the same shells placed within a hollow mold divided in two pieces.
Figure 7:
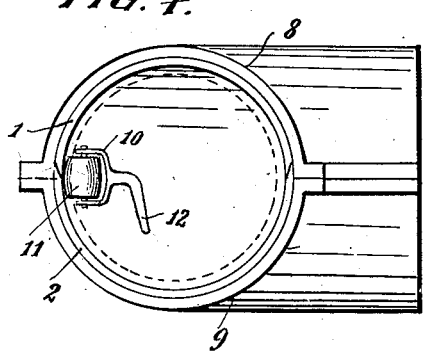
Fig. 7 shows the same hollow mold reunited after the molding cores have been drawn out, and after the joint-forming tool has been introduced.
Figure 6:
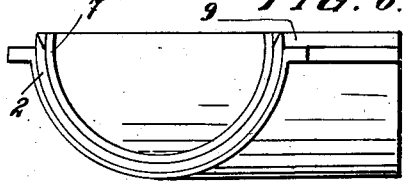

The two shells 1, 2 composing the sleeve 3 present borders 4, 5 wrought in bias in such a manner as to be mutually adjusted by a lap joint. Said shells are preferably molded upon two drum cores 6, 7, one of which is somewhat more developed in order to permit the forming of the projecting border 5. After their molding the shells 1, 2 are accurately placed into the hollow molds 8, 9 and the cores 6, 7 are warily drawn out. At last the two molds 8, 9 are adjusted together, as shown on Fig. 7, and the ramming operation is executed, my means of which the mutual joining of the oblique borders 4, 5 is produced. Said operation can be easily effected by means of a ramming tool 10 provided with a roller 11 shaped in such a manner as to adapt itself to the inner surface of the piece to be formed. Said roller is mounted on the end of a pliable arm 12 by means of which the ramming tool can be brought to pass and repass on the joint to be soldered.

Of course the described devices and operations may be varied in any manner obvious for the skilled in the art, according to the kind and the shape of the pieces to be manufactured, without exceeding the scope of the invention.

What I claim is:

1. A method of forming hollow bodies of cement mixed with fibrous material such as asbestos, comprising independently molding two shells adapted to fit together to form the desired hollow body, from a mortar of a fiber containing cement, on the exterior surface of two separate cores, obliquely cutting the edges of each of the shells to provide mitered edges adapted to co-operate to retain the assembled shells together, placing the formed shells while still soft and plastic together with the cores in two separated sections of a mold, removing the cores and adjusting the sections of the mold together, while at the same time placing the mitered edges of the molded shells together in mutual overlapping relation in the position in which they are to be joined, and rolling a pressure roller over the joined edges while the shells are still in the mold to securely bind the soft plastic mitered edges together.

2. A method of making a tubular conduit elbow of circular cross-section, comprising independently molding on the exterior surface of two separate cores two shells adapted to fit together to form the elbow, from a fiber containing cement mortar, the semi-tubular wall of one of said shells extending through an arc of 180°, mitering the edges of the semi-tubular wall from the edge at the inner surface to the exterior surface, so that the inner skin of the semi-tubular wall extends through an arc of substantially 180° and the outer skin covers an arc of less than 180°, the other of said shells having its semi-tubular wall extending through an arc greater than 180°, mitering its edges to correspond to those of the other shell and so that the inner skin of the shell extends through an arc of substantially 180° and the outer skin covers an arc equal to 360° minus the arc covered by the outer skin of said other shell, placing the formed shells while still soft and plastic together with the cores in two separated sections of a mold, removing the cores and adjusting the sections of the mold together, while at the same time placing the mitered edges of the molded shells together in mutual overlapping relation in the position in which they are to be joined, and rolling a pressure roller over the joined edges while the shells are still in the mold to securely bind the soft plastic mitered edges together.

ALESSANDRO MAGNANI.